P. WERNER.
FASTENER.
APPLICATION FILED FEB. 2, 1920.
1,367,339.
Patented Feb. 1, 1921.
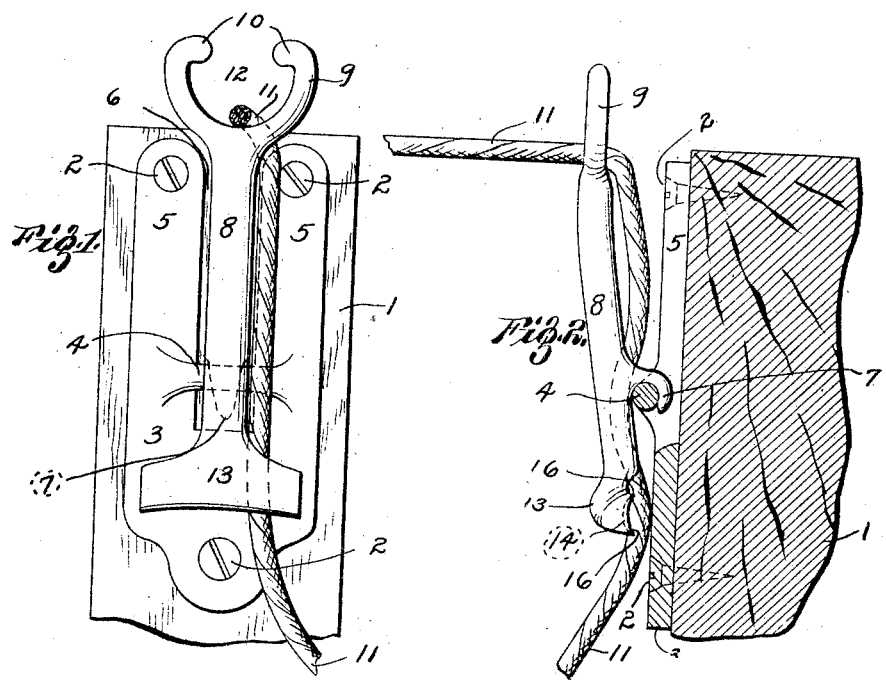
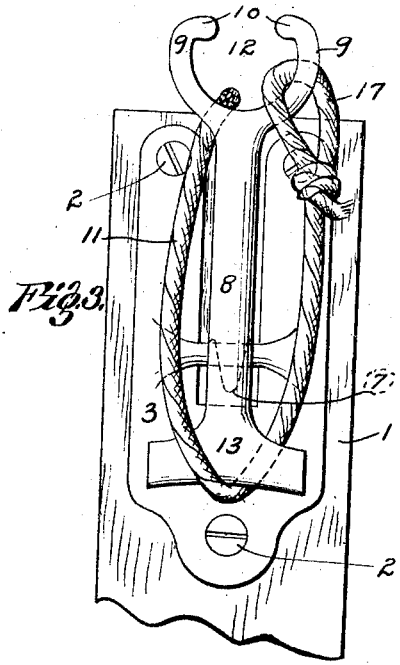
Inventor,
Paul Werner,
by Hugh A. Wagner
Atty.

UNITED STATES PATENT OFFICE.

PAUL WERNER, OF ST. LOUIS, MISSOURI.

FASTENER.

1,367,339.  Specification of Letters Patent.  Patented Feb. 1, 1921.

Application filed February 2, 1920. Serial No. 355,594.

*To all whom it may concern:*

Be it known that I, PAUL WERNER, a citizen of the United States, residing at the city of St. Louis, in the State of Missouri, have invented certain new and useful Improvements in Fasteners, of which the following is a specification.

This invention is a clip or grip for fastening cords, ropes, and the like of any size, and may be used wherever it is desired to hold a line extended or stretched between a plurality of points. This device saves the time and work of tying knots or wrapping the rope or cord around a stake or pin or other belaying device.

This device, if made of suitable size and strength, can be used for attaching hawsers or cables on board ship or elsewhere, and can be used, also, for fastening ropes in hoisting-machinery, derricks, and the like. If made of smaller size, it can be utilized for fastening clothes-line, either in-doors or out-of-doors.

It can be made of cast-iron, malleable iron, aluminum, or other suitable material, and, as it is formed by molding and requires no machine work to make, it is very cheap to manufacture. It can, also, be stamped and pressed, which may be even cheaper.

Furthermore, it has no springs or other parts to break or get out of order.

When a cord or rope or the like is held by this device, the greater the weight or strain put upon the cord or rope, the more tightly it is fastened. Another advantage of this device is that, when the weight or strain upon a line fastened at two points causes the same to sag between the said points, by reason of stretching (slippage against the "bite" of this device being impossible), a simple pull on one end of the line, causing the same to slide through this device, removes the said sag and again renders the line taut between the points of attachment.

In the accompanying drawings forming part of this specification, in which like numbers of reference denote like parts wherever they occur, Figure 1 is a front elevation;

Fig. 2 is a sectional view on the line 2—2 in Fig. 1; and

Fig. 3 is a view like Fig. 1, but with the rope or the like caught over the free end of the grip.

This device is attached to a fence or post or windowframe, or the like 1 by screws 2. The plate 3 is provided with a plurality of screwholes for the screws 2. The bar 4 in Figs. 1, 2, and 3 is formed integral with the arms 5 of a fork at one end of the plate 3. The slot 6 lies between the said arms 5.

Hook 7, formed integral with tongue 8, engages bar 4 and is adapted to rock thereon. One end of tongue 8 is provided with a fork 9, the extremities of the fork-members terminating in lugs 10 adapted to prevent the cord or rope 11 from flopping out of the crotch 12 formed by the fork 9 in case wind blows the main body of the cord or rope in that direction.

The plate 3 is screwed permanently to its support, and only when the same is to be used is it necessary for the tongue 8 to be attached thereto, which is done by seating hook 7 over bar 4.

When the device has been attached to its proper position in the way shown in the drawings, the line 11 can with ease be laid in the crotch 12 or fork formed by the arms 9 and then the end of the line 11 or a part of such rope be brought down so as to lie between grip 13 and plate 3, and if desired this can be hitched by loop 17 over either of the fork-members 9, as shown in Fig. 3, which will have the effect in case of wind blowing the line upward of preventing any loosening of the line.

It is to be particularly noted that the hook 7 is of such length that in its engagement with the bar, it will extend so far below the transverse diametric line of the bar as to prevent endwise separation of the tongue and plate so long as a rope is beneath the bearing portion 13. This prevents the possibility of the rope forcing the tongue from its pivotal connection with the bar.

The normal action of the gripping-device is such that any pull on any part of the line in a direction away from the device results in pressing the grip 13 upon and into the line 11, and the harder the pull the more tightly does the said grip press into the said line, the integral member comprising tongue 8, fork-members 9, and the grip 13 pivoting on bar 4.

It is immaterial whether the fixed member is wider than the movable one or vice versa.

Having thus described this invention, I hereby reserve the benefit of all changes in form, arrangement, order, or use of parts, as it is evident that many minor changes may be made therein without departing from the spirit of this invention or the scope of the following claim.

I claim:

In a device of the class described, a fixed plate having a longitudinal slot and formed near the lower end of the slot with an integral pivot bar extending transversely of the slot, a tongue having a rope-bearing portion at one end for coöperation with the plate below the slot, and a rope-receiving yoke at the opposite end, said tongue having an integral hook to engage the pivot bar, the bar engaging surface of the hook conforming to the shape of the bar and being of a length exceeding one-half the length of the transverse surface of the bar, the coöperation of the hook and bar preventing endwise separation of the tongue and plate while a rope or the like is held between the bearing portion of the tongue and plate.

In testimony whereof I hereunto affix my signature.

PAUL WERNER.